(12) United States Patent
Gao et al.

(10) Patent No.: US 8,930,749 B2
(45) Date of Patent: Jan. 6, 2015

(54) SYSTEMS AND METHODS FOR PREVENTING DATA LOSS

(75) Inventors: Xue Dong Gao, Shanghai (CN); Roah Jishi, San Diego, CA (US); David Ray Kahler, Tucson, AZ (US); Keith Geoffrey Morrison, San Jose, CA (US); Karl Allen Nielsen, Tucson, AZ (US); Micah Robison, Tucson, AZ (US); Jeremy Leigh Royall, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 13/437,574

(22) Filed: Apr. 2, 2012

(65) Prior Publication Data
US 2013/0262921 A1 Oct. 3, 2013

(51) Int. Cl.
*G06F 11/00* (2006.01)
(52) U.S. Cl.
USPC .......................................... 714/6.32; 714/6.22
(58) Field of Classification Search
CPC .................................................. G06F 11/1092
USPC ........... 714/6.3, 6.24, 6.13, 6.22, 42, 54, 6.32
See application file for complete search history.

(56) References Cited

U.S. PATENT DOCUMENTS

| | | | |
|---|---|---|---|
| 6,415,189 B1 | 7/2002 | Hajji | |
| 7,058,762 B2* | 6/2006 | Patterson et al. | 711/114 |
| 7,434,095 B2* | 10/2008 | Tanaka et al. | 714/6.24 |
| 7,562,249 B2 | 7/2009 | Daikokuya et al. | |
| 7,574,623 B1 | 8/2009 | Goel et al. | |
| 7,698,592 B2 | 4/2010 | Cashman | |
| 7,721,157 B2 | 5/2010 | Spitz et al. | |
| 7,730,370 B2 | 6/2010 | Francis et al. | |
| 7,877,626 B2* | 1/2011 | Piszczek et al. | 714/6.2 |
| 8,074,112 B1 | 12/2011 | Chang et al. | |
| 2003/0131197 A1 | 7/2003 | Morrison | |
| 2005/0210322 A1* | 9/2005 | Corrado | 714/13 |
| 2007/0150651 A1* | 6/2007 | Nemiroff et al. | 711/114 |
| 2008/0010503 A1* | 1/2008 | Cashman | 714/6 |
| 2008/0148094 A1 | 6/2008 | Manning et al. | |
| 2008/0256397 A1 | 10/2008 | Smith | |
| 2009/0044043 A1* | 2/2009 | Cherian et al. | 714/6 |

* cited by examiner

*Primary Examiner* — Dieu-Minh Le
(74) *Attorney, Agent, or Firm* — Griffiths & Seaton PLLC

(57) ABSTRACT

For preventing data loss in storage systems a detection is made that a storage device in a plurality of storage devices is experiencing a malfunction. The type of malfunction is determined. A SMART rebuilding technique, a normal building technique, a data migration technique, or a user data backup technique is selected to preserve the data in the storage device based on the determined type of the malfunction. The selected technique is performed on the storage device.

13 Claims, 2 Drawing Sheets

SYSTEMS AND METHODS FOR PREVENTING DATA LOSS

BACKGROUND OF THE INVENTION

1. Field of the Invention

The present invention relates generally to computing systems, and more particularly to, methods and systems for preventing data loss in storage subsystems.

2. Description of the Related Art

RAID technology is widely used in high-end storage subsystems. Each RAID type can tolerate a limited number of disk drive failures. For example, a RAID 5 array can have, at most, one disk drive failure at any given time without data loss. If another disk drive fails during the rebuild period, a data loss occurs.

Certain RAID architectures implement prioritized rebuild algorithms so that if I/O activity is addressed to data in the RAID that is not protected by redundancy, the I/O is queued or blocked until the redundancy of the data is re-established by the applicable RAID algorithm. For example, if the data is protected by a RAID 5 parity redundancy scheme and a host or client targets a read operation to the RAID array, the RAID 5 algorithm may be applied first before servicing the host or client read request.

In the RAID level, there are several components and also there are redundant components. In a RAID 5 configuration, a parity component is utilized so that a data loss error can be rebuilt from another disk, which is termed a recoverable error that can use a threshold to track the recovery. When other errors (i.e., non-recoverable errors) occur, the failing disk should be removed as soon as possible.

Current methods to proactively remove a suspect array component member rely on rejecting the member disk drive from the RAID array as if it failed to trigger the RAID rebuild from parity. The long running array rebuild exposes the array redundancy to a secondary failure that can lead to data loss. Also, the array rebuild increases the probability of hitting a secondary failure that can cause strip data loss. While RAID provides redundancy, the architecture does not predict or remove compromised members out of the system prior to failure in a manner that prevents an array rebuild.

SUMMARY OF THE INVENTION

Various embodiments provide systems for preventing a loss of data in a storage system. One system comprises a plurality of storage devices configured to store data in a plurality of data addresses and a processor coupled to the plurality of storage device. The processor is configured to detect that a storage device in the plurality of storage devices is experiencing a malfunction and determine the type of malfunction. The processor is further configured to select a SMART rebuilding technique, a normal rebuilding technique, a data migration technique, or a user data backup technique to preserve the data in the storage device based on the determined type of malfunction and perform the selected SMART rebuilding technique, normal rebuilding technique, data migration technique, or user data backup technique on the storage device.

Other embodiments provide methods for preventing a loss of data in a storage system including a plurality of storage devices each storing data in a plurality of data addresses. One method comprises detecting that a storage device in the plurality of storage devices is experiencing a malfunction and determining the type of the malfunction. The method further comprises selecting a SMART rebuilding technique, a normal rebuilding technique, a data migration technique, or a user data backup technique to preserve the data in the storage device based on the determined type of malfunction and performing the selected SMART rebuilding technique, normal rebuilding technique, data migration technique, or user data backup technique on the storage device.

Various other embodiments provide physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product method for preventing a loss of data in a storage system including a plurality of storage devices each storing data in a plurality of data addresses. One physical computer storage medium comprises computer code for detecting that a storage device in the plurality of storage devices is experiencing a malfunction and computer code for determining the type of malfunction. The physical computer storage medium further comprises computer code for selecting a SMART rebuilding technique, a normal rebuilding technique, a data migration technique, or a user data backup technique to preserve the data in the storage device based on the determined type of malfunction and computer code for performing the selected SMART rebuilding technique, normal rebuilding technique, data migration technique, or user data backup technique on the storage device.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Various embodiments provide systems and methods for preventing data loss in storage subsystems. Also provided are physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product method for preventing a loss of data in a storage system.

Figure 1:
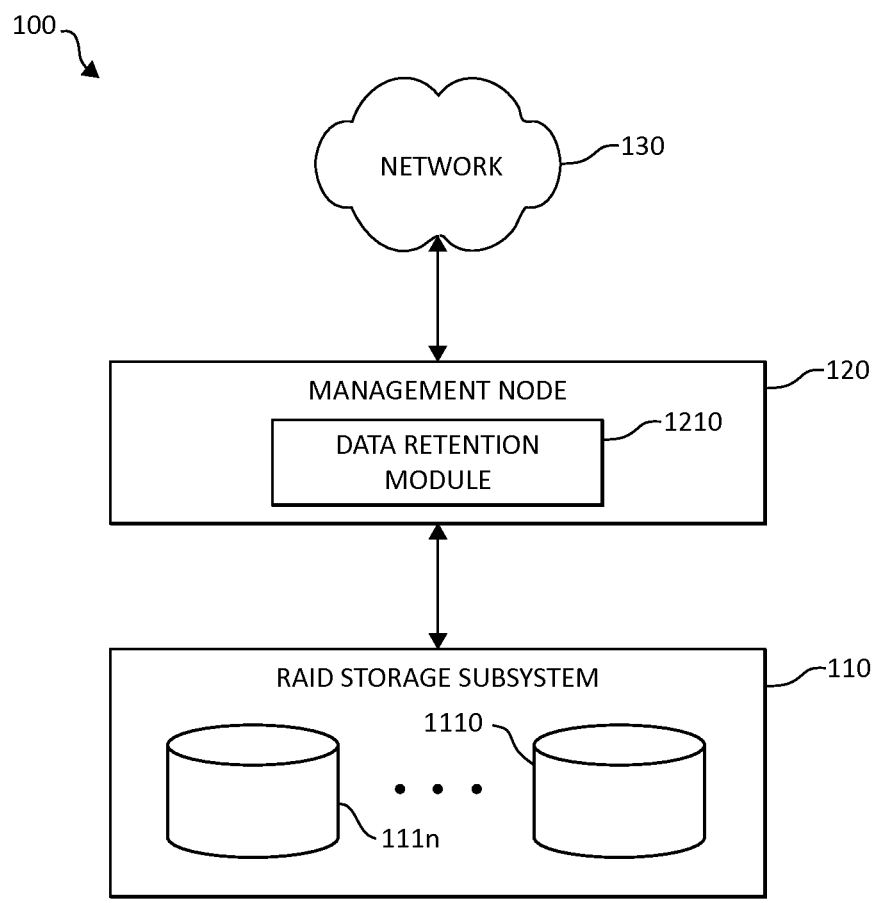
FIG. 1 is a block diagram of one embodiment of a system for preventing data loss in a storage subsystem.

Turning now to the figures, FIG. 1 is a block diagram of one embodiment of a system 100 for preventing data loss in a storage subsystem. At least in the illustrated embodiment, system 100 comprises a redundant array of independent disks (RAID) storage subsystem 110 coupled to a management node 120 that is in communication with a network 130 (e.g., a wide area network (WAN), a local area network (LAN), a storage area network (SAN), a converged network, an intranet, the Internet, and/or the like networks).

RAID storage subsystem 110 comprises a plurality of storage devices (e.g., disks 1110-111n). Disks 1110-111n may be arranged in any RAID configuration (e.g., RAID 0, RAID 1, RAID 2, RAID 3, RAID 4, RAID 5, RAID 6, RAID 10, etc.). Each of disks 1110-111n is configured to store data in a plurality of data addresses within disks 1110-111n. To prevent a loss of data within disks 1110-111n, system 100 comprises management node 120.

Management node 120, in one embodiment, comprises a data retention module 1210 configured to prevent a loss of data within disks 1110-111n. Management node 120 may be any processor, controller, and/or other device capable of executing the computer code forming data retention module 1210.

Data retention module 1210 is configured to determine if one or more of disks 1110-111n is experiencing a fault condition and to determine the type of fault condition. Examples of fault conditions include, but are not limited to, simple or threshold errors (e.g., a media error, key code qualifier (KCQ) error, and the like errors), one or more failed disks, one or more failed RAID arrays, and the like fault conditions.

In one embodiment, data retention module 1210 is configured to initiate a SMART rebuilding technique when data retention module 1210 determines that one or more of disks 1110-111n is experiencing a simple or threshold error. The term "SMART rebuild" applies to the use of a mirroring RAID pair against a component of another RAID architecture.

For example, a 3+P RAID 5 array includes components D1, D2, D3, P. If component D2 in this array is used as the source of a SMART rebuild, a mirror (RAID 1) array over D2 is established and a RAID mirror is used to complete a consistent mirror of D2. Here, the RAID 1 mirror components may be referred to as D2s and D2t, where D2s is component 2 of the RAID 5 array and D2t is the target for the RAID 1 mirror. When rebuilding, data written to D2t can be reconstructed from D1, D3, P, or read from D2s.

Continuing the example, component D2 can be selected as the source of a SMART rebuild, an ephemeral RAID 1 mirror is established, and when D2t becomes consistent with D2s, D2s can be logically removed from the RAID 5 array. Here, D2t becomes component 2 of the RAID 5 array.

In one embodiment, data retention module 1210 is configured to detect if a particular data address and/or range of addresses is at a greater risk of loss and prioritize the SMART rebuild. That is, data retention module 1210 is configured to perform the SMART rebuild on the data address or range of addresses before performing the SMART rebuild on other addresses that are not determined to be at risk of data loss.

For example, a component D3 that is externalized recoverable or unrecoverable faults in LBA region Ma-Mb, correlating to a RAID5 array LBA range Xa-Xb. A different component D2 that is externalized recoverable or unrecoverable faults in LBA region Na-Nb, correlating to a RAID5 array LBA range Ya-yb. A SMART rebuild is initiated concurrently on components D2 and D3. The RAID 5 and RAID 1 topology is D1, (D2s, D2t), (D3s, D3t), and P.

The client/host "reads" are triggered or simulated against the RAID LBAs Xa-Xb and against the RAID LBAs correlating to component D2s Na-Nb. Similarly, "reads" are triggered or simulated against the RAID LBAs Ya-Yb correlating to component D3s Ma-Mb. The RAID algorithms act on D2t by reading from D2s or by reconstructing with RAID5 from D1, D3s, and P to reconstruct LBAs Xa-Xb on D2t. The RAID algorithms act on D3t by reading from D3s or reconstructing from D1, D2s, and P to reconstruct LBAs Ma-Mb on D3t. The result of the read operation is that redundancy in the RAID system is established early in the rebuild cycle for the at-risk array LBA ranges Xa-Xb and Ya-Yb.

The SMART rebuild on D2t and D3t proceed normally until RAID 1 redundancy is established for the pair. Furthermore, D2t and D3t become the primary components of the RAID 5 array and the RAID 1 ephemeral array relationships are terminated. By prioritizing reads to the RAID array based on prior history of failing or faulty array components, higher data redundancy is achieved earlier in the rebuild cycle and the risk of a strip data loss in the case of escalating failures is reduced.

The term "strip data loss" applies when array data redundancy is exposed due to the failure of one or more components and the RAID rebuild algorithm encounters an unrecoverable read error during a RAID rebuild operation that prevents correct data reconstruct. This situation can occur in variety of raid algorithms: RAID 1 (mirroring), RAID 5 (parity), RAID 6, and the like.

In another embodiment, data retention module 1210 is configured to perform a "normal" rebuild technique when data retention module 1210 determines that one or more of disks 1110-111n is failing or has failed. The normal rebuild technique, in one embodiment, includes replacing the failing or failed disk(s) with one or more new disks and rebuilding the RAID array from the other non-failed or properly functioning disk(s).

Data retention module 1210, in yet another embodiment, is configured to migrate data from one array in the RAID architecture to another array in the RAID architecture when data retention module 1210 determines that one or more arrays in the RAID architecture is/are failing and there is more than a predetermined amount of time left before the array or arrays fail. The predetermined amount of time is any amount of time that enables the data in the failing array(s) to be migrated to one or more other arrays in the RAID architecture. Examples of predetermined amounts of time include, but are not limited to, one day, one week, one month, or any other amount of time that enables the data in the failing array(s) to be migrated to one or more other arrays in the RAID architecture. When there is less than the predetermined amount of time left, data retention module 1210 is configured to perform a different data retention technique.

When data retention module 1210 determines that one or more arrays in the RAID architecture is/are failing and there is less than or equal to the predetermined amount of time left before the array or arrays fail, data retention module 1210 is configured to transmit, via network 130, the data to a remote location for backup. In one embodiment, the remote location is a different storage subsystem related to system 100. In another embodiment, the remote location is a different storage subsystem including, for example, the storage subsystem of a customer and/or client.

Figure 2:
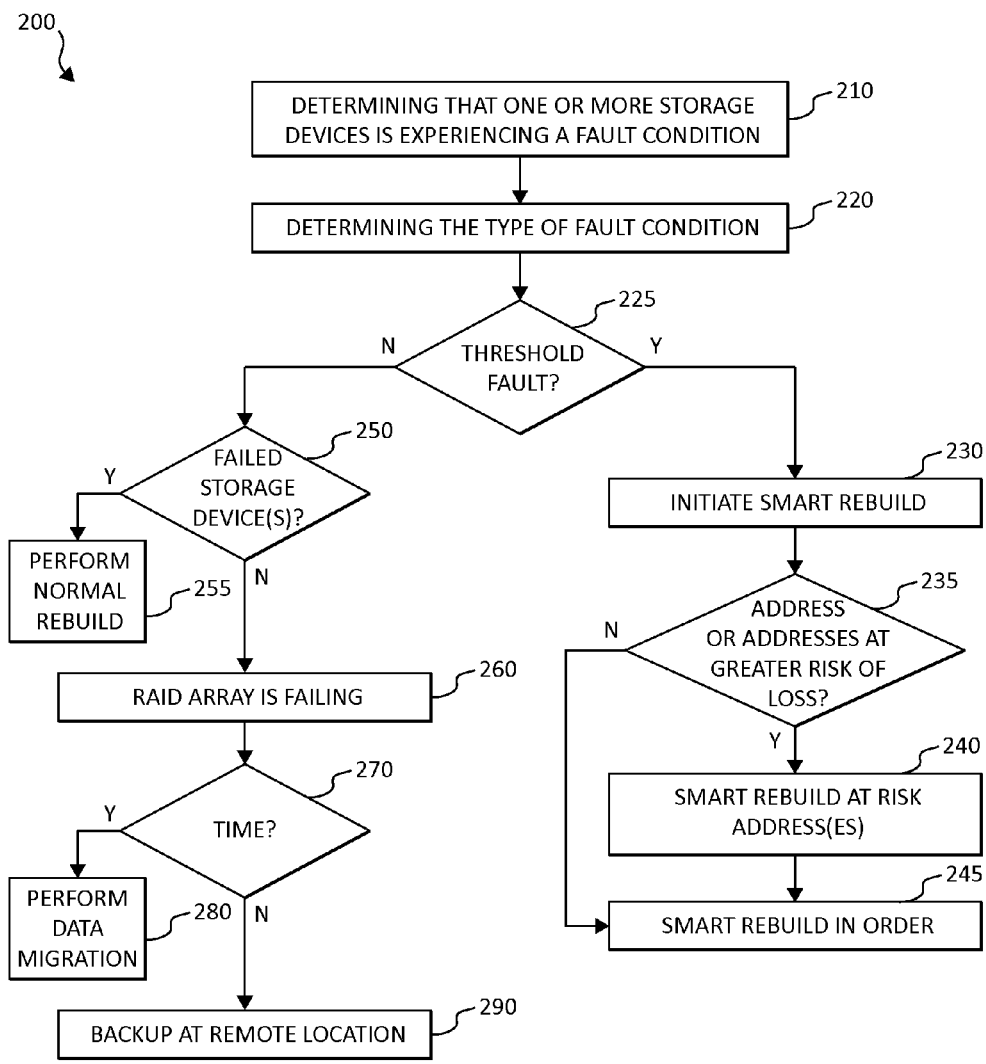
FIG. 2 is a flow diagram of one embodiment of a method for preventing data loss in a storage system.

With reference now to FIG. 2, FIG. 2 is a flow diagram of one embodiment of a method 200 for preventing data loss in a storage system comprising a plurality of storage devices (e.g., disks 1110-111n) each storing data in a plurality of data addresses. At least in the illustrated embodiment, method 200 begins by determining and/or detecting that one or more of the storage devices is experiencing a fault condition (block 210) and determining the type fault condition (block 220).

When the determined fault condition is a simple or threshold fault (e.g., a media error) (block 225), method 200 includes initiating a SMART rebuild on the storage device(s) (block 230). After initiating the SMART rebuild, method 200 includes determining if one or more data addresses or range of addresses is a greater risk of data loss (block 235).

If one or more data addresses or range of addresses is at a greater risk of data loss than other data addresses, the SMART rebuild is performed on this/these data addresses first (block 240) and the SMART rebuild is performed in order on the data addresses (block 245). If one or more data addresses or range of addresses is not at a greater risk of data loss than other data addresses, the SMART rebuild is performed in order on the data addresses (block 245).

When the determined fault condition is that one or more of the storage devices is failing or has failed (block 250), method 200 includes performing a normal rebuild on the storage device(s) (block 255). In one embodiment, performing the normal rebuild includes replacing the failing or failed storage device(s) with one or more new storage devices and rebuilding the RAID array from the other non-failed or properly functioning storage device(s).

When the determined fault condition is that one or more RAID arrays are failing (block 260), method 200 includes determining if there is greater than a predetermined amount of time before the RAID array fails (block 270). If there is more time than the predetermined amount of time before the RAID array fails, method 200 includes migrating data from the failing array in the RAID architecture to another array in the RAID architecture (block 280). The predetermined amount of time is any amount of time that enables the data in the failing array(s) to be migrated to one or more other arrays in the RAID architecture. Examples of predetermined amounts of time include, but are not limited to, one day, one week, one month, or any other amount of time that enables the data in the failing array(s) to be migrated to one or more other arrays in the RAID architecture.

When there is less than or equal time to the predetermined amount of time before the RAID array fails, method 200 includes transmitting the data in the failing RAID array to a remote location for backup (block 290). In one embodiment, the remote location is a different RAID system. In another embodiment, the remote location is a different storage subsystem including, for example, the storage subsystem of a customer and/or client.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A system for preventing a loss of data in a storage system, comprising:
   a plurality of storage devices configured to store data in a plurality of data addresses; and
   a processor coupled to the plurality of storage device, wherein the processor is configured to:
      detect that a storage device in the plurality of storage devices is currently experiencing a malfunction,
      determine a type of the malfunction,
      select one of a SMART rebuilding technique, a normal rebuilding technique, a data migration technique, and a user data backup technique to preserve the data in the storage device, the selection based on the determined type of the malfunction, and
      perform the selected one of the SMART rebuilding technique, the normal rebuilding technique, the data migration technique, and the user data backup technique on the storage device.

2. The system of claim 1, wherein the storage system comprises a RAID 5 configuration comprising the plurality of data addresses and wherein the processor has determined that the type of the malfunction is that the storage device is experiencing a media error, the processor configured to:
   select the SMART rebuilding technique; and
   perform said SMART rebuilding technique, the SMART rebuilding technique comprising:
      prioritizing each data address in the storage device, and
      rebuilding a first range of data addresses in the storage device based on the priority.

3. The system of claim 2, wherein, when prioritizing each data address, the processor is configured to determine that the first range of data addresses is more susceptible to loss than a second range of data addresses.

4. The system of claim 3, wherein, when rebuilding the first range of data addresses, the processor is configured to:
   initially rebuild the first range of data addresses; and
   rebuild the second range of data addresses and any remaining data addresses in the storage device subsequent to rebuilding the first range of data addresses.

5. The system of claim 2, wherein the processor has determined that the type of the malfunction is that the storage device has failed, the processor configured to:
   select the normal rebuilding technique; and
   perform the normal rebuilding technique, the normal rebuilding technique comprising replacing the storage device with a new storage device.

6. The system of claim 5, wherein the processor has determined that the type of the malfunction is that the plurality of storages device will fail outside a predetermined amount of time, the processor configured to:
   select the data migration technique; and
   perform the data migration technique, performing the data migration technique comprising migrating the data in the plurality of storage devices to a new plurality of storage devices.

7. The system of claim 6, wherein the processor has determined that the type of the malfunction is that the plurality of storages device will fail within the predetermined amount of time, the processor configured to:
   select the user data backup technique; and
   perform the user data backup technique, performing the user backup technique comprises migrating the data in the plurality of storage devices to a remote storage system.

8. A non-transitory computer storage medium comprising a computer program product method for preventing a loss of data in a storage system including a plurality of storage devices each storing data in a plurality of data addresses, the non-transitory computer storage medium comprising:
   computer code for detecting that a storage device in the plurality of storage devices is currently experiencing a malfunction;
   computer code for determining a type of the malfunction;
   computer code for selecting one of a SMART rebuilding technique, a normal rebuilding technique, a data migration technique, and a user data backup technique to preserve the data in the storage device, the selection based on the determined type of the malfunction; and
   computer code for performing the selected one of the SMART rebuilding technique, the normal rebuilding technique, the data migration technique, and the user data backup technique on the storage device.

9. The physical non-transitory computer storage medium of claim 8, wherein the storage system comprises a RAID 5 configuration comprising the plurality of data addresses and wherein:
   the computer code for determining the type of the malfunction comprises computer code for determining that the storage device is experiencing a media error;
   the computer code for selecting comprises computer code for selecting the SMART rebuilding technique; and
   the computer code for performing said SMART rebuilding technique comprises:
      computer code for prioritizing each data address in the storage device, and
      computer code for rebuilding a first range of data addresses in the storage device based on the priority.

10. The physical non-transitory computer storage medium of claim 9, wherein:
   the computer code for prioritizing each data address comprises computer code for determining that the first range of data addresses is more susceptible to loss than a second range of data addresses; and
   the computer code for rebuilding the first range of data addresses comprises:

computer code for initially rebuilding the first range of data addresses, and computer code for rebuilding the second range of data addresses and any remaining data addresses in the storage device subsequent to rebuilding the first range of data addresses.

11. The physical non-transitory computer storage medium of claim 9, wherein:

the computer code for determining the type of the malfunction comprises computer code for determining that the storage device has failed;

the computer code for selecting comprises computer code for selecting the normal rebuilding technique; and the computer code for performing the normal rebuilding technique comprises computer code for replacing the storage device with a new storage device.

12. The physical non-transitory computer storage medium of claim 11, wherein:

the computer code for determining the type of the malfunction comprises computer code for determining that the plurality of storages device will fail outside a predetermined amount of time;

the computer code for selecting comprises computer code for selecting the data migration technique; and the computer code for performing the data migration technique comprises computer code for migrating the data in the plurality of storage devices to a new plurality of storage devices.

13. The physical non-transitory computer storage medium of claim 12, wherein:

the computer code for determining the type of the malfunction comprises computer code for determining that the plurality of storages device will fail within the predetermined amount of time;

the computer code for selecting comprises computer code for selecting the user data backup technique; and the computer code for performing the user data backup technique comprises computer code for migrating the data in the plurality of storage devices to a remote storage system.

\* \* \* \* \*